L. F. FAULKNER.
SAW GUIDE.
APPLICATION FILED SEPT. 7, 1920.

1,385,673.                    Patented July 26, 1921.

INVENTOR
LAWSON F. FAULKNER
By
ATTYS.

UNITED STATES PATENT OFFICE.

LAWSON F. FAULKNER, OF ALEZA LAKE, BRITISH COLUMBIA, CANADA.

SAW-GUIDE.

1,385,673.     Specification of Letters Patent.     Patented July 26, 1921.

Application filed September 7, 1920. Serial No. 408,674.

*To all whom it may concern:*

Be it known that I, LAWSON F. FAULKNER, a Canadian, a subject of the King of Great Britain, and a resident of Aleza Lake, in the Province of British Columbia, Canada, have invented certain new and useful Improvements in Saw-Guides, of which the following is a specification.

My invention relates to improvements in saw guides and the object of my invention is to provide a saw guide which is extremely simple in construction and operation, which is strong and powerful, which enables the saw to be changed readily and quickly, and the use of which eliminates danger to the sawyer.

I attain this object by the construction illustrated in the accompanying drawings in which—

Similar figures of reference indicate similar parts throughout the several views.

Figure 1:
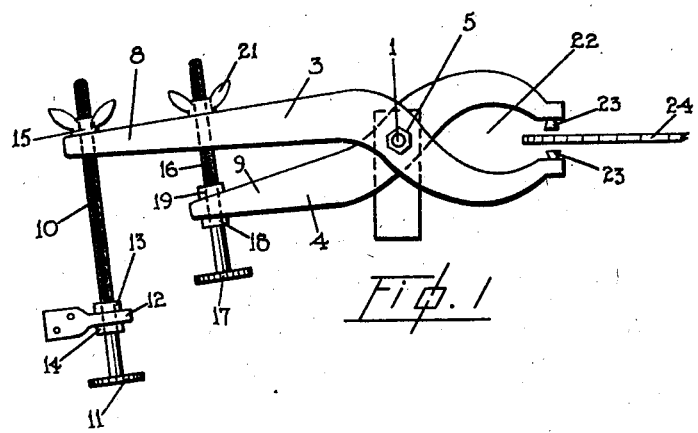
Figure 1 is a plan view of my device.

1 indicates a vertical stud adapted to be rigidly secured into the saw bed plate 2 on the upper end of which stud are fulcrumed for movement independently of each other arms 3 and 4, these arms being held in place on the stud, by nuts 5 and 6 and washers or collars 7, as shown. The rear end 8 of arm 3 is of greater length than the rear end 9 of arm 4 and threaded through the rear end of arm 3 is an adjusting screw 10 one end of which is provided with a suitable hand-wheel 11 and is carried to a point within easy reach of the operator and is supported in a fork member 12 rigidly secured to the saw frame, collars 13 and 14 being fixed to the screw 10 on opposite sides of the fork 12 to prevent longitudinal movement of the screw. The opposite end of the screw 10 projects through the arm 3 and is provided with a wing locking nut 15.

Figure 4:
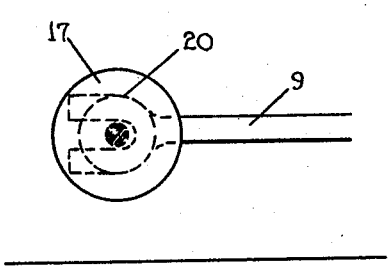
Fig. 4 is a view of the short arm forked end.

16 indicates an adjusting screw threaded through the rear end of arm 3 at a point in advance of the screw 10 one end of which is also carried to a point within easy reach of the operator, this screw being provided with a suitable hand-wheel 17 and spaced collars 18 and 19 between which engages workably the end of the shorter guide arm 4, which is forked, as at 20, as shown in Fig. 4. The opposite end of the screw 16 projects through the arm 3 and is provided with a wing locking nut 21.

The front or outer ends of the guide arms are formed as jaws 22 carrying removable tapered wooden plugs 23 between which the saw revolves when the device is in place. 24 indicates a portion of the saw.

Figure 2:
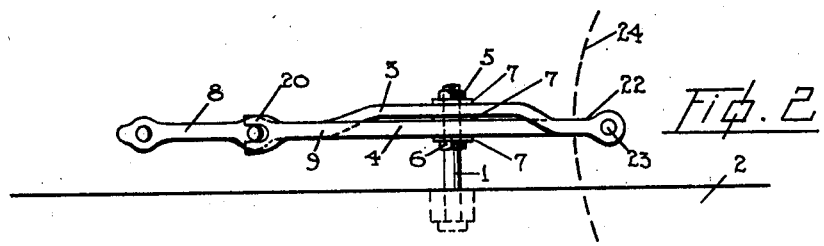
Fig. 2 is a side view.
Figure 3:
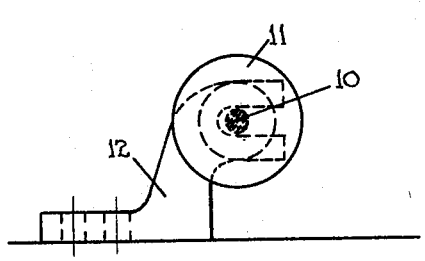
Fig. 3 is a view of the long arm adjustment screw supporting bracket.

The manner in which the device is used may be described briefly as follows:—The guide is mounted as shown in Figs. 1 and 2, the saw then lying between the jaws 22 and when the saw is running the jaws are moved in until the plugs 23 just touch the saw. Guiding the saw in or out of the log is effected by rotating the screw 10 in the required direction, as the operation of this screw moves both guide arms 3 and 4 about the pivot stud 1, the screw 16 being, of course, locked while movement of the arm 3 independently of the arm 4 to swing its jaw toward or away from the saw is effected by actuating both screws 10 and 16 in the required direction. To move the arm 4 independently of arm 3 the screw 10 is locked and the screw 16 alone actuated as required.

From the foregoing it will be seen that I have devised a simple, strong, and inexpensive saw guide which is of great convenience and utility.

What I claim as my invention is:—

A saw guide comprising a vertical stud, a pair of jaw members pivotally mounted on said stud adapted to have the jaw portions thereof disposed on each side of the saw blade, the rear end of one member being forked and of less length than the rear end of the other member, a rigidly secured forked bracket, a screw passed rotatably through said forked bracket threaded into the rear end of the longer member provided with fixed collars arranged on the opposite sides of the fork, a screw passed rotatably through the fork of the shorter member threaded into the longer one provided with fixed collars arranged on the opposite sides of the fork, and means for locking said screws against movement.

Signed at Hutton, B. C., Canada, this 11th day of August 1920.

LAWSON F. FAULKNER.